United States Patent
Libman et al.

(10) Patent No.: US 6,608,814 B1
(45) Date of Patent: Aug. 19, 2003

(54) SESSION RESOURCE MANAGER AND METHOD FOR ENHANCING VISIBILITY AND CONTROL OF A BROADBAND NETWORK

(75) Inventors: Roger Edward Libman, Naperville, IL (US); Stephen Lee Myers, Aurora, IL (US); Randall E. Pitt, Batavia, IL (US); David W. Spears, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/267,548

(22) Filed: Mar. 12, 1999

(51) Int. Cl.[7] .......................... G01R 31/08; H04L 12/28
(52) U.S. Cl. ..................................... 370/230; 370/395.2
(58) Field of Search ................................. 370/352, 353, 370/354, 356, 358, 395.1, 396, 397, 399, 395.2, 395.31, 395.52, 395, 230

(56) References Cited

U.S. PATENT DOCUMENTS

| | | | |
|---|---|---|---|
| 5,631,903 A | 5/1997 | Dianda et al. | 370/401 |
| 5,729,545 A | 3/1998 | Libman | 370/384 |
| 6,097,722 A * | 8/2000 | Graham et al. | 370/395 |
| 6,172,991 B1 * | 1/2001 | Mori | 370/474 |
| 6,253,230 B1 * | 6/2001 | Couland et al. | 709/203 |

OTHER PUBLICATIONS

"Why all of the interest in ATM?" Sep. 25, 1998, notes 2–7, http://www.atmforum.com/atmforum/library/notes2.html.

* cited by examiner

*Primary Examiner*—Wellington Chin
*Assistant Examiner*—Brenda Pham

(57) ABSTRACT

In general, the SRM provides a network provider with visibility and control of its broadband network. A SRM connection manager receives setup signals to and from a subscriber and acts on them by analyzing the setup signals and by either comparing the setup signals to predefined rules, which are either static or dynamic, or modifying them. The access server provides intelligence to the SRM by verifying authentication information according to the connection manager's database and continuously updating the connection manager database for further modification of the subscriber's acquired session.

21 Claims, 6 Drawing Sheets

SESSION RESOURCE MANAGER AND METHOD FOR ENHANCING VISIBILITY AND CONTROL OF A BROADBAND NETWORK

FIELD OF THE INVENTION

The present invention generally relates to broadband networks. More specifically, the invention is related to a session resource manager which provides a network provider with visibility and control of its broadband network.

BACKGROUND OF THE INVENTION

The advancement of technology has led to a need for the accommodation of simultaneous transmission of data, voice and video regardless of the "end-system." To accommodate this need, asynchronous transfer mode (ATM) was designed. With ATM, the goal is to have one international standard for use with local area networks (LAN) and wide area networks (WAN). This accommodation of both LANs and WANs has led ATM to be an emerging technology driven by international consensus and not by a single vendor's view or strategy.

ATM is a high-bandwidth, low delay, connection-oriented switching and multiplexing technique which uses fixed-sized cells. ATM is a cell-based technology and does not have to process every packet and calculate the most efficient route to a destination. Additionally, ATM offers quality of service guarantees for constant bit rate traffic that are time sensitive, such as voice and video, adding up to lower latency and the ability to handle very large bandwidths.

ATM supports both permanent virtual circuits, which are long-duration, provisioned connections, and switched virtual circuits (SVC), which are short-duration connections, established by endpoint signaling, much as is done for narrowband ISDN telephony. When a subscriber needs to communicate information using ATM switched virtual circuit technology, the subscriber's endpoint equipment negotiates with the network for a connection to the destination using a standard protocol over a predetermined signaling channel, which is separate from the connection being requested. In setting up this connection, the ATM network is provided with the specific destination, type, bandwidth, and other attributes of the call, which will determine the end-to-end quality of service (QoS). In turn, ATM switches set up the connection. However, the ATM switches lack the intelligence of normal telephone switches which can, depending on certain factors, and in coordination with other intelligent network elements, provide call-related features, including modifying the destination of a call and providing service-based billing and other value-added services. Examples of these services include 800 and 900 calls. While the simplicity of ATM networks and switches keeps them inexpensive and fast, they lack proper means of allowing a network provider to provide intelligent network-like services.

Presently, due to the lack of intelligence provided by an ATM network, a network provider can only offer connections with agreed-upon QoS. Therefore, the billing provided by network providers is usually only capable of being based on connection time and QoS parameters, such as the bandwidth utilized. This, unfortunately, is the extent of a network provider's billing capabilities relative to a subscriber's connection to an ATM network. The network provider cannot offer consolidated billing for a service requiring multiple connections, provide services based on QoS guarantees, offer services that are personalized, or allow or deny access to services and connections based on the identity of the individual making the call, not just on the endpoint equipment's ATM address.

SUMMARY OF THE INVENTION

Briefly described, the invention is a session resource manager (SRM) that utilizes the combination of a connection manager, which is located within the signaling path between a subscriber's endpoint equipment and an ATM switch, and an access server, for purposes of providing a network provider with desired visibility and control over subscriber sessions.

For better understanding, the term session is defined as a relationship between the subscriber and the network operator resources, such as network connections, network elements such as conference bridges, and service provider resources, such as content servers, necessary to provide the subscriber with a desired data service. It begins when the subscriber selects a service and ends when the subscriber disconnects from that service. Within the session, one or more ATM connections may be established and released.

In general, the first embodiment of the invention provides for a subscriber's use of the SRM access server to select a service or connection from a personalized menu. First, a connection request from a subscriber's endpoint equipment to the SRM access server is allowed or disallowed by the SRM connection manager based upon the SRM connection manager's database. If a connection is allowed, the SRM access server either automatically authenticates the subscriber or waits for the subscriber to provide authentication information. After authentication information has been provided, the SRM access server verifies the authentication by checking the SRM connection manager's database. After verifying the subscriber's identification, the SRM retrieves subscriber service information. Utilizing this information, a personalized services menu is returned to the subscriber for selection of services to be rendered. Finally, in accordance with the subscriber's setup request, the SRM connection manager's database is updated through its application programming interface to allow connections with the required characteristics to be established to and/or from the subscriber's endpoint equipment, and a data connection, or connections, is established between the subscriber's endpoint equipment and the data service which has been selected. When the subscriber is finished with the service, the SRM connection manager database is again updated by removing the data which allowed the connections for the service just completed.

Optionally, more than one connection may be established for a service and more than one service may be selected.

The invention has numerous advantages a few of which are delineated hereafter as examples. Note that the embodiments of the invention which are described herein possess one or more, but not necessarily all, of the advantages set out hereafter.

One advantage of the invention is that the network provider is provided improved visibility into the operation of its network by being able to know what activities are being performed on the network.

Another advantage of the invention is that it provides for maximum control by the network provider. This is due to the subscriber being required to go through the network provider's predefined requirements in order to establish required ATM connections for a service which the subscriber has requested.

Another advantage of the invention is that it can correlate the connections and other network resources used to provide a service to a subscriber. This provides the network operator with additional flexibility in billing. Specifically, it enables service-based billing in addition to the existing connection-based billing.

Another advantage of the invention is that the network provider can guarantee that customers receive the bandwidth for which they have contracted at any ATM endpoint under the control of the SRM.

Another advantage of the invention is that, by providing an application program interface to the SRM connection manager database, and by allowing the use of an existing World Wide Web server on the SRM access server, the network provider can create new broadband service offerings.

Another advantage of the invention is, by routing only signaling through the SRM, and not bearer channels, the SRM does not have to handle high data volume.

Another advantage of the invention is that it implements methods which can provide the intelligence required by network providers to offer advanced services without requiring expensive hardware or software modifications to current ATM switch, access network or customer-premises equipment products, thereby keeping these existing products standards-based and quick.

Another advantage of the invention is that, due to the SRM connection manager and SRM access server being separate, a network provider may expand on the part of the SRM which requires increased capacity, without requiring replacement of the entire SRM.

Other objects, features and advantages of the present invention will become apparent to one of reasonable skill in the art upon examination of the following drawings and detailed description. It is intended that all such additional objects, features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which however should not be taken to limit the invention to the specific embodiment, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE PREFERRED EMBODIMENT

The SRM 10 of the present invention can be implemented in hardware, software, firmware, or a combination thereof. In the preferred embodiment, the SRM 10 implemented as a software package which is adaptable to run on different platforms and operating systems as shall be described further herein.

The SRM program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
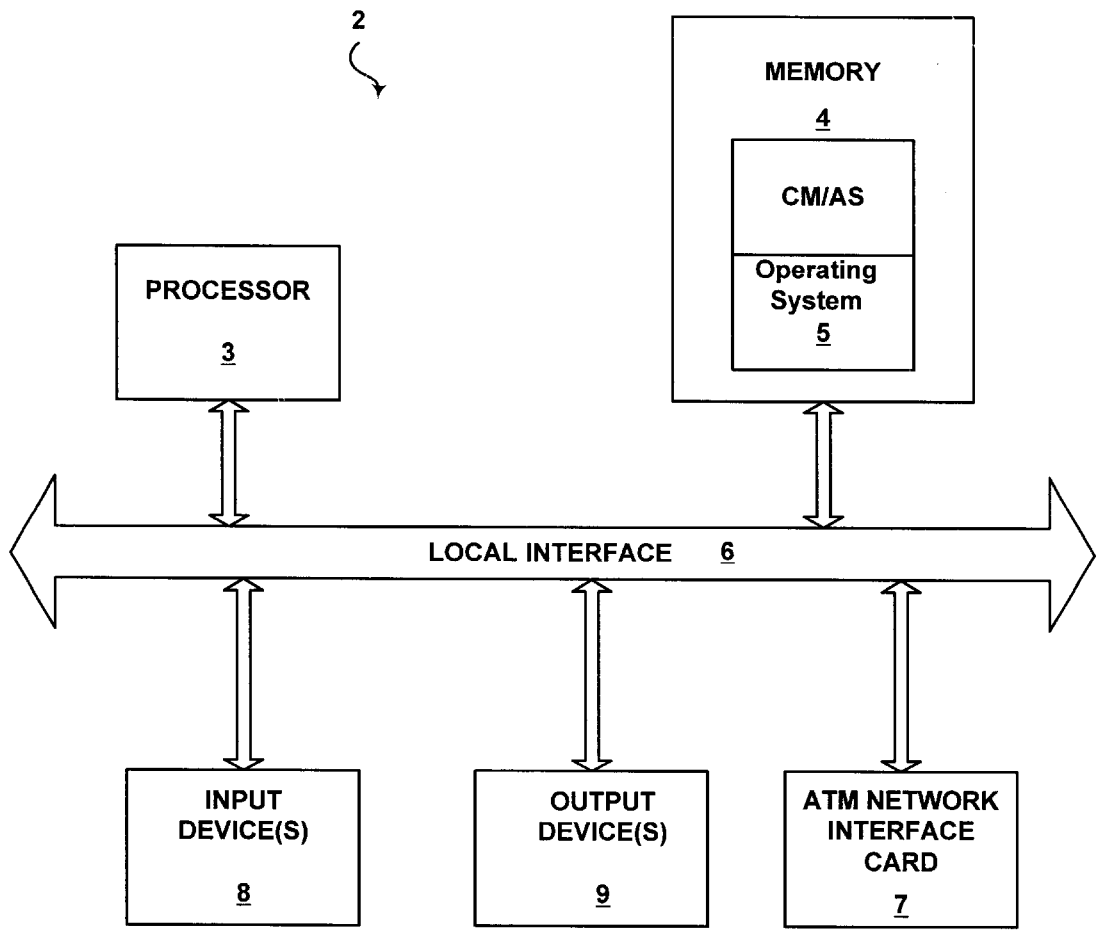
FIG. 1 depicts a typical system which may utilize the SRM program..

Turning now to the drawings, wherein like reference numerals designate corresponding parts throughout the drawings, FIG. 1 illustrates a typical computer or processor-based system which may utilize the SRM program. FIG. 1, shows a computer system 2 generally comprising a processor 3, and a memory 4 with an operating system 5. The processor 3 accepts data from memory 4 over a local interface 6, such as a bus(es). The system 2 also includes input device(s) 8 and output device(s) 9. Generally, this system may run any of a number of different platforms and operating systems, including, but not limited to, the Unix®, WindowsNT®, or SunSolaris® operating systems. The SRM program resides in memory 4 and via an ATM Network Interface Card 7, communicates with an ATM network. Each system utilizing the SRM program is configured as either a SRM connection manager (shown as CM) or a SRM access server (shown as AS), the functions of which shall be described with reference to FIG. 3 through FIG. 5B.

Figure 2:
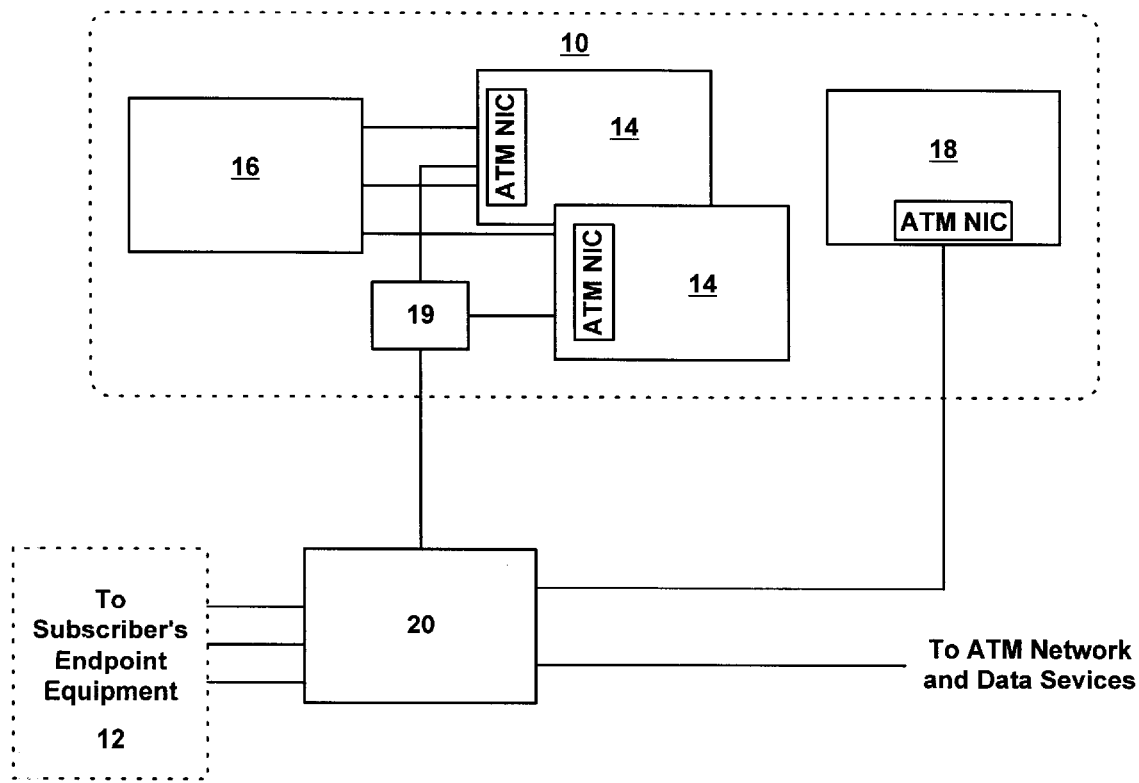
FIG. 2 depicts the physical connectivity between the SRM, subscriber's endpoint equipment, and an ATM Network and data service.

FIG. 2 illustrates the physical connectivity between the SRM 10, subscriber's endpoint equipment 12, and the ATM Network and data service. More than one subscriber may be connected to the SRM 10. The subscriber's system is physically connected to an Access ATM Switch 20. The SRM 10 may comprise of more than one SRM connection manager 14 for prevention of SM 10 failure. When more than one SRM connection manager 14 is utilized, an optical switch 19 may be used to control which SRM connection manager 14 is active. The SRM connection managers 14 are connected to the optical switch 19 via ATM Network Interface Cards. The SRM connection managers 14 are also connected to a SRM connection manager database 16 for data retrieval and updating. The SRM connection managers 14 communicate with the SRM access server 18 via a connection through ATM Network Interface Cards. More than one SRM access server 18 may be provided for. The connections to, and within the SRM 10, merely hold signaling messages, as opposed to data, thus connections to data services are not routed through the SRM 10.

Figure 3:
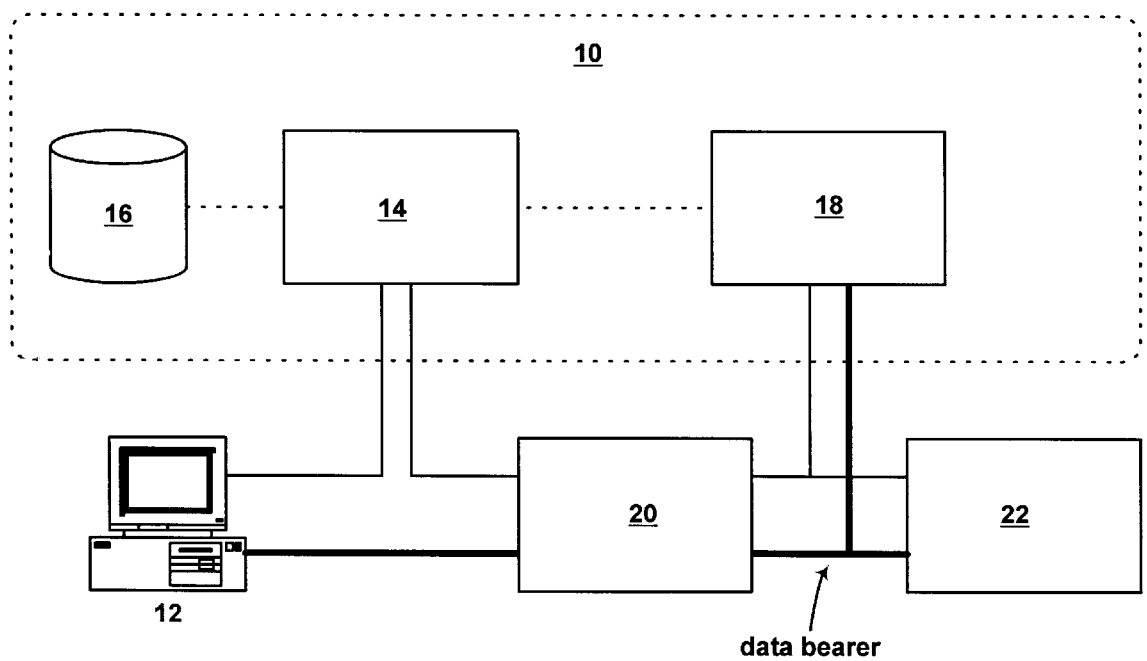
FIG. 3 shows a block diagram functionally depicting how the SRM of FIG. 2 is utilized within an ATM-based data services network.

FIG. 3 is a block diagram functionally depicting how the session resource manager (SRM) 10 is utilized within an ATM-based data services network 22, according to a first embodiment of the invention. In accordance with the first embodiment of the invention, when a subscriber needs to communicate information using ATM Switched Virtual Circuit Technology, the subscriber's endpoint equipment negotiates a connection with the ATM-based data services network. In making the request, the Q.2931 broadband ISDN user-network interface (UNI) signaling protocol may be used. Q.2931 is an ITU standard describing the signaling protocol to be used for Switched Virtual Circuits on an ATM LAN. One of ordinary skill in the art will appreciate that any signaling protocol having similar characteristics to the Q.2931 broadband ISDN signaling protocol may be used for making such a request.

In the first embodiment of the invention, the SRM 10 contains a SRM connection manager 14, a SRM connection manager database 16 and a SRM access server 18. Both the SRM connection manager 14 and SRM access server 18 are systems, as defined by FIG. 1, which utilize the SRM program to enable performance of the SRM in accordance with the invention. The SRM connection manager 14 is located in the signaling path between the subscriber's endpoint equipment 12 and an Access ATM switch 20. Thus, the SRM 10 is in a position to control the signaling required to set up and release Switched Virtual Circuits, whether requested by the subscriber's endpoint equipment toward another ATM endpoint, or by another ATM endpoint toward the subscriber's endpoint equipment. The SRM connection manager 14 also provides for services without having ATM bearers pass through the SRM 10. The significance of routing only the signaling through the SRMi:10, and not the ATM bearers, is that the SRM 10 will not have to handle vast amounts of data, but instead, only signaling, which is low bandwidth and infrequent.

The SRM connection manager 14 provides for control and processing of connection control signaling messages to and from the subscriber's endpoint equipment 12. The SRM connection manager 14 examines the control signaling messages and can pass them on unchanged or with appropriate modification in selected parameters. For example, the SRM connection manager 14 can substitute a different destination ATM address from that in the original signaling message; this allows the SRM to redirect a connection, enabling services such as call forwarding and enabling distribution of connections across equivalent servers to balance the call load to a service. As another example, the SRM connection manager 14 can substitute QoS parameters, such as Peak Cell Rate, in order to establish a connection required for a desired service. The SRM connection manager 14 can also block connection control signaling messages, generating the appropriate negative acknowledgment to the originator of the message. The decision of whether to pass or block the control signaling messages is based upon predefined contents of the SRM connection manager database 16. The SRM connection manager 14 can also initiate control signaling messages, as required to provide a selected service. The SRM connection manager database 16 contains information required to control and modify ATM signaling for each ATM endpoint controlled by the SRM 10. The database 16 may contain both "static" information, that is, information which is provisioned by the network provider and is valid for more that one ATM session, and "dynamic" information, that is, information that is provided by the SRM access server 18 through a database application programming interface and is valid for only one ATM session.

Any SVC which is accepted by the SRM connection manager 14 may be recorded as a network resource for later inclusion in a billing record for the service. The time of connection establishment (and time of release) as well as all relevant connection parameters such as bandwidth, priority, symmetry, and other QoS parameters may also be kept in a resource record. On termination of the subscriber's session, all resource records for the session are included in a billing record for retrieval by the network provider. This billing record can then be utilized by the network provider to bill according to parameters which the network provider wishes to utilize.

The SRM access server 18, which is also provided for by the SRM 10, communicates with subscriber end-point equipment. The SRM access server 18 monitors subscriber logon, and provides a menu interface, allowing the subscriber 12 to select from services offered by the network. In the first embodiment of the invention, the menu interface is a personalized menu, containing subscriber-specific information and menu selections obtained from the SRM connection manager database 16 or other database, which is delivered using a protocol, for example, but not limited to, Hypertext Transfer Protocol (HTTP). The SRM access server 18 also communicates with the SRM connection manager 14, as necessary, to modify the connection control information used by the SRM connection manager 14 to accept, modify or block connection control signaling messages.

While in the first embodiment of the invention, identification of subscribers is performed by comparing the subscriber supplied logon obtained by the SRM access server with provisioned information in the SRM connection manager database 16, it should be noted that the database used for identifying subscribers need not be the SRM connection manager database 16. As an example, if the SRM access server 18 is a Web server which supports active server pages, verification information identifying the subscriber 12 can be obtained from any database readily accessible via the server. Therefore, the SRM access server 18 allows the authors of the active server page to decide which database will be examined for identification verification.

Optionally, more than one SRM connection manager may be provided. The advantage of having more than one SRM connection manager is that this would increase reliability of the SRM since malfunction of the SRM connection manager would prevent access to the ATM network from all subscriber endpoints with signaling handled by the failed SRM connection manager. Therefore, providing more than one SRM connection manager 14 acts to hamper the chances of these complications occurring.

Also, more than one SRM access server 18 may be provided. As the number of users of a SRM access server 18 increases, a network provider need only increase the number of SRM access servers and provide the appropriate information in the SRM connection manager database 16. This procedure informs the SRM connection manager 14 of the additional SRM access servers so that the SRM connection manager 14 can distribute connections from subscribers over all SRM access servers. When the number of endpoints for a particular SRM connection manager 14 increases beyond the SRM connection manager's capability, growth may be provided for by using a more powerful processor, or multiprocessor computer. Growth may also be provided for by adding additional SRM connection managers.

In a second embodiment of the present invention the SRM includes an HTTP server in the SRM access server 18 which provides a user-friendly front-end interface to the network. When a subscriber logs onto the network, the SRM, at the option of the network provider, downloads a menu of available services which are presented to the subscriber 12. As in the first embodiment of the invention, this menu can be customized on a per-subscriber basis through the SRM connection manager database 16. This menu typically will contain a list of services to which the subscriber is allowed access. Because the menu can be created by the HTTP server in the SRM access server 18 using information obtained from the connection manager database 16 or other database, as selected by the network provider, it may also contain other general or subscriber-specific content such as targeted advertising. Once the subscriber selects the desired service, communication between the subscriber's PC and the SRM 10 is triggered to create a session with, and connection or connections to, the selected service.

Figure 4:
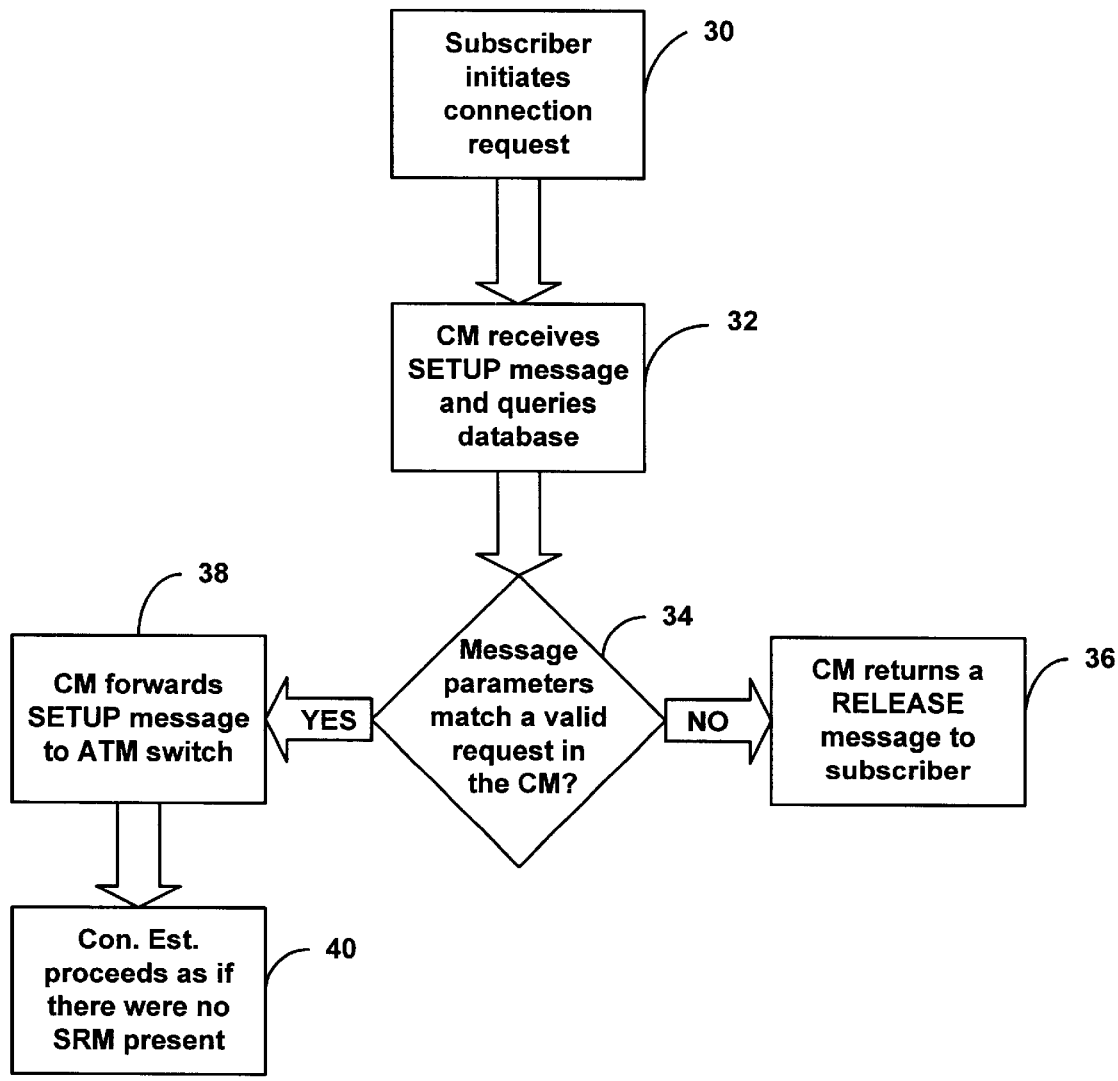
FIG. 4 shows a flow diagram depicting the generic way a SRM connection manager handles a request from a subscriber requesting a connection.

FIG. 4 is a flow diagram of the way a SRM connection manager 14 handles a subscriber request for a connection. First, a subscriber 12 initiates a connection request. This connection request results in a UNI SETUP message which is transmitted to the ATM network. The UNI SETUP message is received by the SRM connection manager 14 due to its location in the signaling path, as previously discussed hereinabove. In turn, the SRM connection manager 14 queries its database 16 to determine whether or not to allow the connection (step 32).

To determine whether or not to allow a connection, the SRM connection manager utilizes selected Information Element fields of the UNI SETUP message such as the called address, calling address, and QoS elements such as the Peak Cell Rate. These parameters, obtained from the UNI SETUP message, are compared to what has been predefined in the SRM connection manager database 16 as parameters which are to allow a connection request (step 34). If the parameters do not match, then the SRM connection manager 14 returns a RELEASE message to the subscriber 12 (step 36). This message is similar to a message which would be received by the subscriber if the connection request was rejected by the ATM switch 20.

If, however, the parameters match allowable parameters which were predefined in the SRM connection manager 14, then the SRM connection manager 14 forwards the SETUP message to the ATM switch 20 (step 38), and connection establishment proceeds as if there were no SRM present (step 40). This process is further explained in reference to FIG. 5A and FIG. 5B. Optionally, the SRM 10 could modify the SETUP message parameters to support different specific services. As an example, the SRM 10 could balance the load across multiple data servers by substituting different destination addresses to direct new connections to the least-heavily loaded server.

Figure 5A:
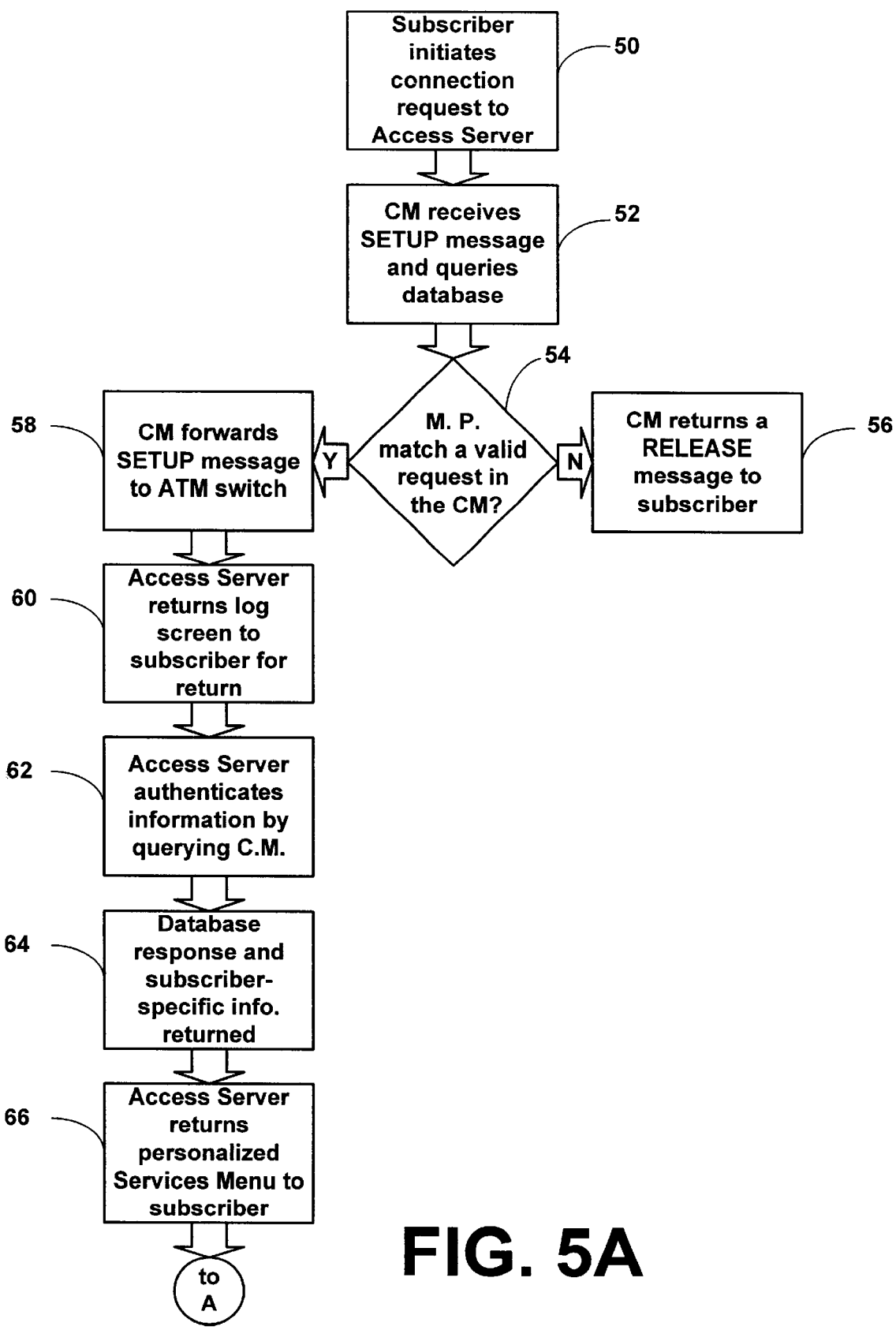
FIG. 5A shows a flow diagram depicting actions taken when a subscriber requests a connection to the SRM access server for authentication and data service selection.
Figure 5B:
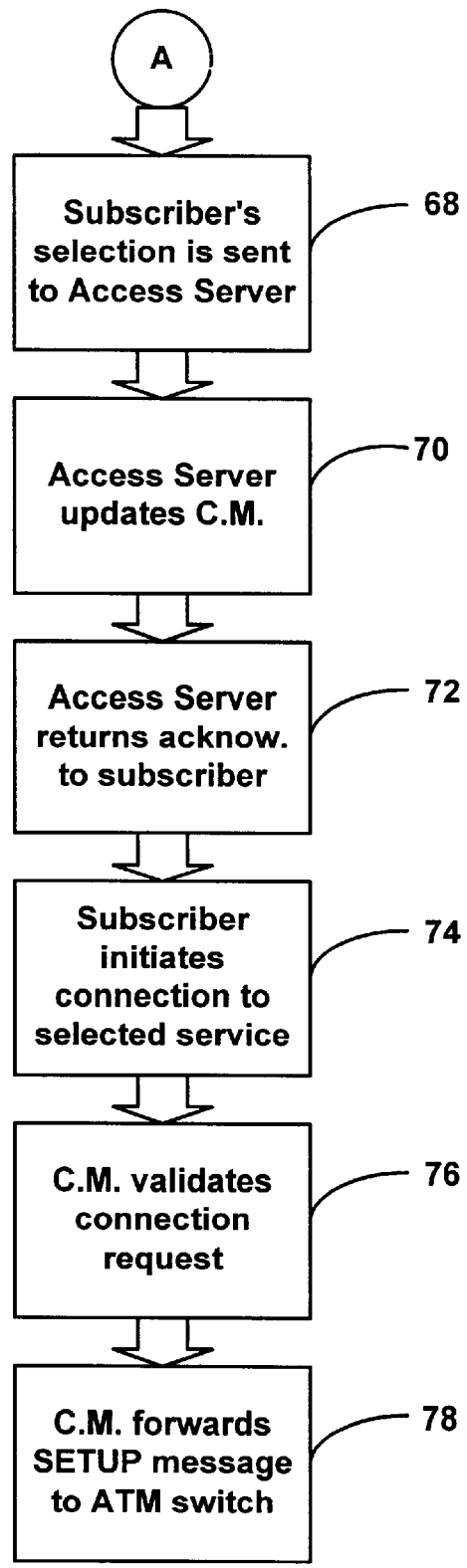
FIG. 5B is a continuation of FIG. 5A.

FIG. 5A and FIG. 5B are flow diagrams, wherein FIG. 5B is a continuation of FIG. 5A, which represent what occurs when a subscriber 12 requests a connection to the SRM access server 18 for authentication and data service 14 selection. In accordance with a first embodiment of the invention, a subscriber 12 initiates a connection request to a SRM access server 18 (step 50). This connection request results in a UNI SETUP message which is transmitted to the ATM network. The UNI SETUP message is then received by the SRM connection manager 14, due to its location in the signaling path, and the SRM connection manager 14 queries its database 16 to determine whether or not to allow the connection (step 52). As described in reference to FIG. 3., parameters received from the UNI SETUP message are then compared to what have been predefined in the SRM connection manager database 16 as parameters which are to allow a connection request (step 54). If the parameters do not match, the SRM connection manager 14 returns a RELEASE message to the subscriber 12 (step 56).

If, however, the parameters do match allowable parameters, the SRM connection manager 14 forwards the SETUP message to the ATM switch 20, and connection establishment proceeds as if there were no SRM 10 present (step 58). Once this message exchange is complete, an ATM bearer is established between the subscriber 12 and the SRM access server 18.

After establishment of the ATM bearer, the SRM access server 18 returns a log-in screen to the subscriber 12 (step 60). In response, the subscriber fills in the required information and returns the information to the SRM access server 18. The SRM access server then verifies the subscriber supplied authentication information by querying the SRM connection manager database 16 (step 62). Alternatively, the SRM access server 18 may automatically authenticate the subscriber. As previously noted, this database need not be the SRM connection manager database 16, but may be a different enumerated database. Assuming that the database response indicates that authentication is valid, the database returns subscriber-specific information to the SRM access server (step 64). In return, the SRM access server 18 returns a personalized Services Menu to the subscriber 12 (step 66).

The subscriber now has the option of selecting a particular service. When the subscriber does select a service, the selection is sent to the SRM access server (step 68). The SRM access server 18 then updates the SRM connection manager database 16 to allow the subscriber to connect to the subscriber selected service (step 70). This update acts as a modification to the SRM connection manager's rules pertaining to which connections to allow. As an example, if the subscriber authentication identified the subscriber as a person under age, certain service access will be allowed or disallowed based upon the SRM access server 18 advising the SRM connection manager 14 to allow or disallow the connections required for the service via the update.

The SRM access server 18 also updates the SRM connection manager database 16 when a subscriber logs off, causing the SRM access server 18 to be released. This update retains any of the dynamic connection information that allowed connections to services during a log-on and returns the SRM connection manager database 16 to its normally-provisioned state.

In response to the subscriber's selection, the SRM access server returns an acknowledgment to the subscriber (step 72). If the selection is honored, the subscriber's end-point then initiates a connection to the selected service (step 74). In response, the SRM connection manager validates the connection request (step 76). This validation request is similar to the validation request performed by the SRM connection manager 14 in step 52, however, the contents of the SRM connection manager database 16, which is queried for validation purposes, are different at this point due to the database update allowing the requested connection which occurred in step 70. Finally, the SRM connection manager 14 forwards the SETUP message to the ATM switch 20, and connection establishment proceeds as if there were no SRM present (step 78) thereby establishing a data bearer from the subscriber 12 to the data service 14.

Optionally, more than one service may be selected by the subscriber 12 or the selected service may require more than one connection. In response step 68 through step 78 will be repeated accordingly. In fact, in a broadband network, the establishment of more than one data bearer is common.

The foregoing has been illustrative of the features and principles of the present invention. Various changes or modifications to the invention may be apparent to those skilled in the art without departure from the spirit and scope of the invention. All such changes or modifications are intended to be included herein and within the scope of the invention.

Therefore, having thus described the invention, at least the following is claimed:

1. A method of providing a network provider with visibility and control of their broadband network, comprising the steps of:
    receiving a connection request;
    resolving said connection request, said connection request resolution selected from the group consisting of allowing, disallowing, and modifying said connection request with a subscriber endpoint equipment based upon predefined allowable setup messages within a database.

2. The method of claim 1, wherein said database contains both static and dynamic information.

3. The method of claim 1, wherein said connection request is performed via a signaling path, and wherein said connection request is received within said signaling path between said subscriber's endpoint equipment and an ATM switch.

4. The method of claim 1, wherein said connection request is for an asynchronous transfer mode (ATM) connection.

5. A method of providing a network provider with visibility and control of a broadband network, comprising the steps of:
    receiving a connection request to a session resource manager access server;
    resolving said connection request, said connection request resolution selected from the group consisting of allowing, disallowing, and modifying said connection request between subscriber endpoint equipment and said session resource manager access server, based upon a predefined allowable setup message within a database;
    in response to an allowed connection request, requesting identification from said subscriber;
    in response to valid identification being returned by said subscriber, returning a personalized services menu to said subscriber for selection of a service; and
    establishing at least one data bearer between said subscriber endpoint equipment and said service, responsive to said subscriber selection.

6. The method of claim 5, wherein said connection request resolution is performed by a session resource manager connection manager.

7. The method of claim 5, wherein said connection request is performed via a signaling path, and wherein said connection request is received within said signaling path, between said subscriber's endpoint equipment and an ATM switch, and said SRM access server.

8. The method of claim 5, wherein said connection request is for an asynchronous transfer mode (ATM) connection.

9. The method of claim 5, wherein said database contains both static and dynamic information.

10. The method of claim 5, further comprising the step of:
    in response to an allowed connection request, establishing at least one ATM bearer between said subscriber endpoint equipment and said SRM access server.

11. The method of claim 5, wherein said SRM access server includes an HTTP server for providing a user-friendly interface to said broadband network.

12. The method of claim 5, wherein said setup messages are defined by information element fields, wherein said information element fields are selected from the group consisting of a called address, a calling address, and QoS elements.

13. The method of claim 6, further comprising the step of:
    said SRM connection manager returning a release message to said subscriber, in response to a disallowed connection request.

14. The method of claim 5, wherein said connection request is made using a Q.2931 broadband ISDN user-network interface (UNI) signaling protocol.

15. A session resource manager for providing a network provider with control and visibility of their broadband network comprising,
    a database containing information to control and modify signaling for each endpoint controlled by said session resource manager;
    at least one SRM connection manager capable of accepting, denying and modifying connection control signaling messages based upon said information in said database; and
    at least one SRM access server capable of communicating with said SRM connection manager to modify connection control information.

16. The session resource manager of claim 15, wherein said SRM access server further comprises a HTTP server for providing a front-end interface to said broadband network.

17. The session resource manager of claim 15, wherein said database contains both static and dynamic information.

18. The session resource manager of claim 15, wherein said session resource manager is defined by two SRM connection managers, said session resource manager further comprising;
    an optical switch, wherein said switch is capable of determining which SRM connection manager is to be utilized at a particular time.

19. The session resource manager of claim 15, wherein said SRM connection manager is located in the signaling path between a subscriber's endpoint equipment and a ATM switch, and said SRM access server.

20. The session resource manager of claim 15, wherein said SRM connection manager only receives signaling messages.

21. A computer readable medium having a session resource manager program, the session resource manager program for providing a network provider with visibility and control of a broadband network, comprising:
    a means for receiving a connection request to a session resource manager access server;
    a means for resolving said connection request, said connection request resolution selected from the group consisting of allowing, disallowing, and modifying said connection request between subscriber endpoint equipment and said session resource manager access server, based upon a predefined allowable setup message within a database;
    a means for requesting identification from said subscriber in response to an allowed connection request;
    a means for returning a personalized services menu to said subscriber for selection of a service in response to valid identification being returned by said subscriber; and
    a means for establishing at least one data bearer between said subscriber endpoint equipment and said service, responsive to said subscriber selection.

* * * * *